Nov. 26, 1929.  T. C. SHIELDS ET AL  1,736,803
SHOWER
Filed Aug. 22, 1927   2 Sheets-Sheet 1
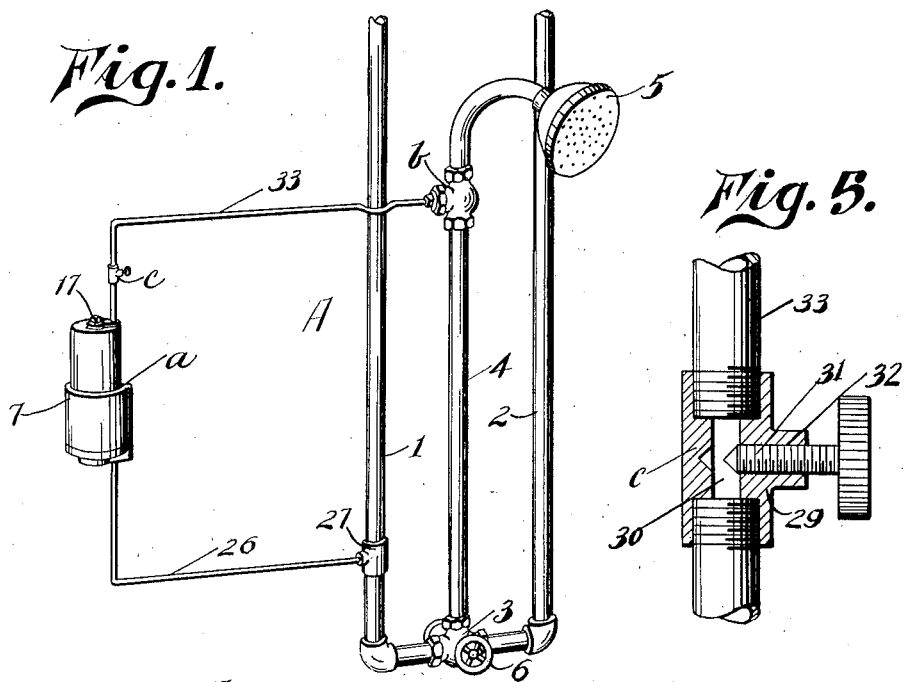
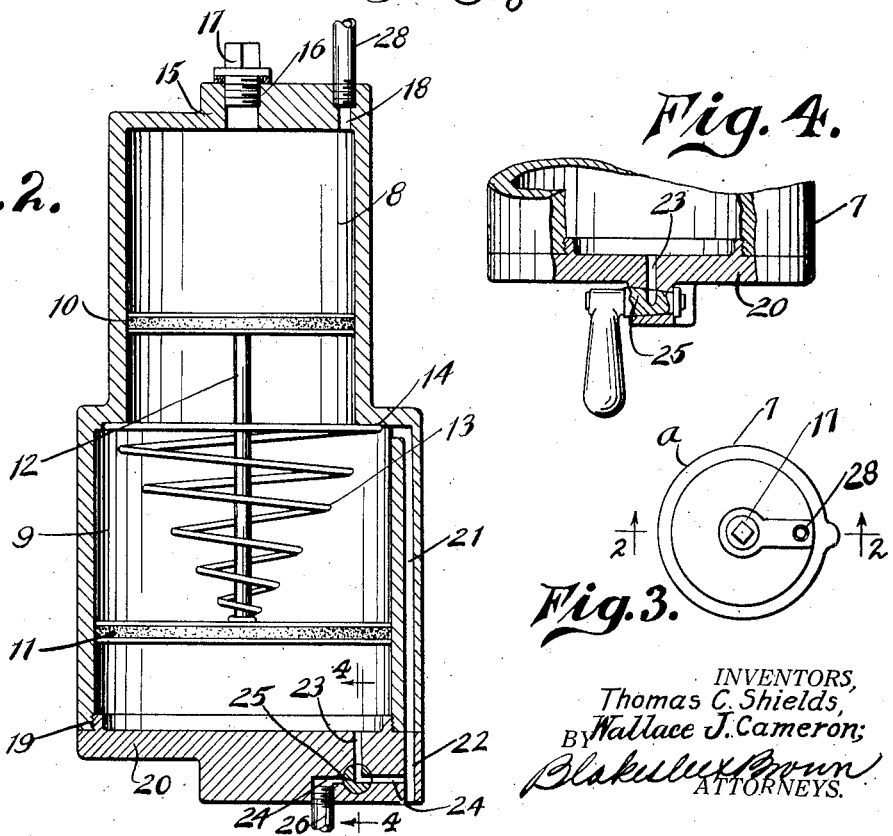

Nov. 26, 1929.  T. C. SHIELDS ET AL  1,736,803
SHOWER
Filed Aug. 22, 1927  2 Sheets-Sheet 2
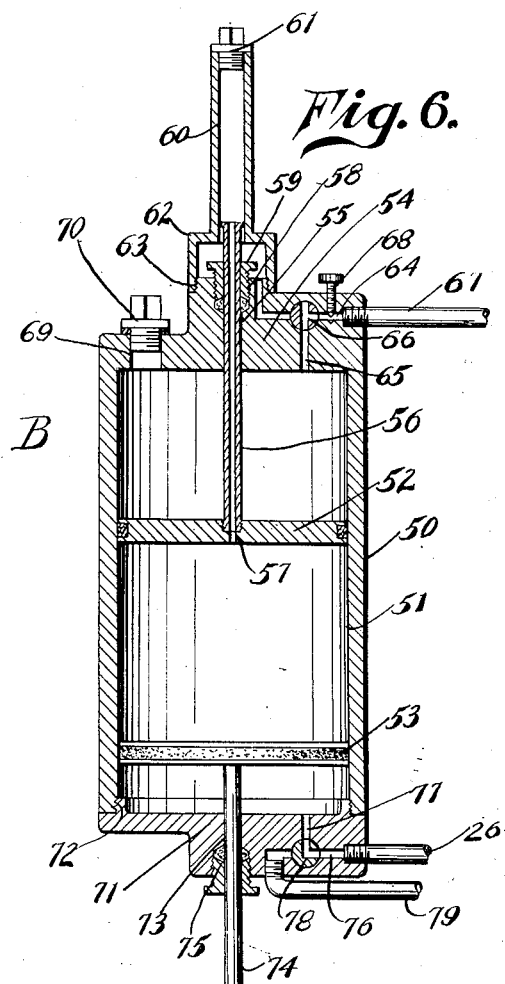
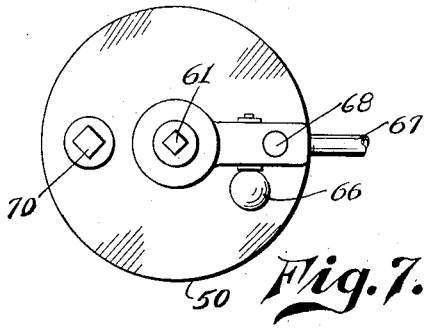
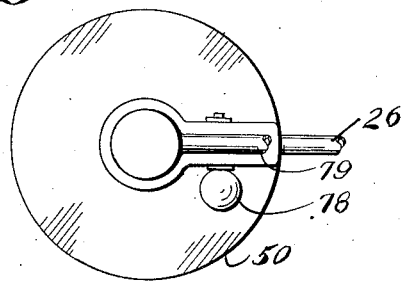
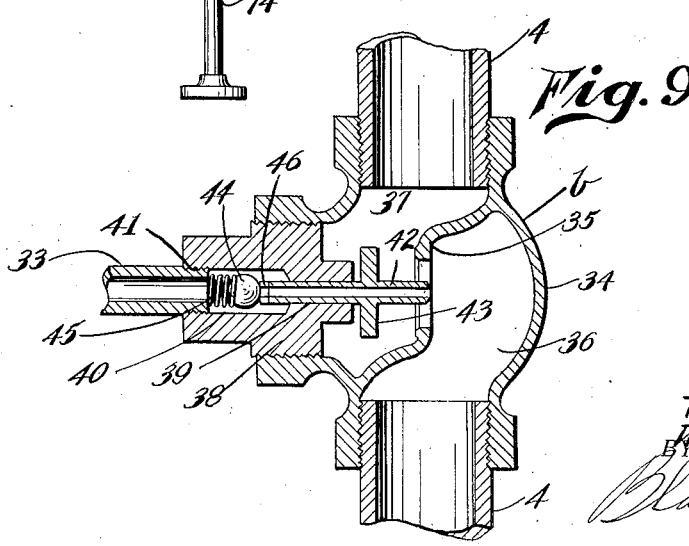
INVENTORS,
Thomas C. Shields,
Wallace J. Cameron;
Blakeslee Brown
ATTORNEYS.

Patented Nov. 26, 1929

1,736,803

UNITED STATES PATENT OFFICE

THOMAS C. SHIELDS AND WALLACE J. CAMERON, OF LOS ANGELES, CALIFORNIA

SHOWER

Application filed August 22, 1927. Serial No. 214,484.

This invention relates to improvements in showers and has among its several objects the provision of a device which may be associated with any standard form of shower now in use, or with any spigot where it is desired to mix a given liquid with another liquid.

Primarily the invention contemplates the provision of a device adapted to hold some fluid which may be perfume, a disinfectant, a liquid soap or any other liquid depending upon the use desired and which liquid is to be admixed with a liquid such as water. The device will be useful in jails where a disinfectant is mixed with the warm water, or in the home a perfume will be mixed with the water.

The invention has for an object the provision of means so associated with a source of water supply that the said means will act to properly mix a liquid with such source of water supply.

Another object is the provision of a device of the character stated wherein wasting of a given liquid to be admixed with another liquid is prevented and whereby the two liquids admix only during flow of one of said liquids.

Other objects include a device which is simple of construction, novel, and generally superior in use and service.

With the above and other objects in view, the invention consists in a novel and useful provision, formation, construction, association and relative arrangement of parts, members and features all as shown in certain embodiments in the accompanying drawings, described generally and more particularly pointed out in the claims.

In the drawings:

Fig. 1 is a perspective view of an adaptation of the invention for use with showers;

Fig. 2 is a vertical sectional view of one of the devices used in practising the invention, and taken on the line 2—2 of Fig. 3;

Fig. 3 is a plan view of the showing of Fig. 2;

Fig. 4 is a fragmentary view partly in section, showing a certain valve arrangement and taken on the line 4—4 of Fig. 2;

Fig. 5 is an enlarged detail view partly in section of a valve used in practising the invention;

Fig. 6 is a vertical sectional view of a modified form of one of the devices of the invention;

Fig. 7 is a plan view of the device shown in Fig. 6;

Fig. 8 is a bottom plan view of the device shown in Fig. 6; and,

Fig. 9 is a vertical sectional view of certain valve means used in practising the invention.

Referring with particularity to the drawings, the improved device shown in Figs. 1 to 5 inclusive is designated as an entirety by A, and that form of the invention shown in Figs. 6 to 8 inclusive by B. That portion of the invention shown in Fig. 9 is common to both the forms A and B.

It is the ordinary practise in showers to provide hot and cold water supply pipes 1 and 2, which are connected through the medium of a T, 3, with a delivery pipe 4, which delivery pipe carries a spray nozzle 5. Usually the T, 3, is provided with valves, a control element of which is shown at 6.

By the present invention it is desired that the water, whether hot or cold or both, should be treated with some medium such as a perfume, disinfectant or any other liquid, such as liquid soap, and that this liquid, whatever its nature, should be intimately admixed with the water flowing through the spray nozzle 5 and only during the period of time that water or like liquid is being passed through said spray nozzle. Our invention in its simplest aspect and of the form designated as A includes means $a$ which is associated with a valve $b$. The means $a$ comprises a container 7, having upper and lower curved chamber portions 8 and 9, of different diameters, the diameter of the chamber portion 9, in the present instance, being greater than the diameter of the chamber 8. Pistons 10 and 11 are within the chambers 8 and 9 respectively, and said pistons are rigidly connected by a stem 12, so as to be held a fixed distance apart. A spring 13 in the form of a spiral helix is shouldered at one end as shown at 14 and the opposite end bears against a surface of the piston 11, the said spring normally urging said pistons in the direction in their respective chambers, which direction will be downwardly if the container is maintained upright as shown in Figs. 1 and 2. The chamber 8 is capped as shown at 15, which cap is provided with a threaded bore 16 adapted to receive a plug 17. Said cap is likewise bored as shown at 18. The container is screw threaded at 19 to receive a base member 20, which base member will close the bottom of chamber 9. The side wall bounding the chamber 9 is formed with a by-pass port 21 terminating at one end adjacent the top of the chamber 9 while the opposite end portion thereof communicates with a port 22 in the base member 20. This base member is likewise provided with ports 23 and 24 with a two way valve 25 between said ports 23 and 24. The port 24 likewise communicates with the port 22. Piping 26 is secured to the base and has communication with the port 24 and likewise in direct communication with the interior of the pipe 1 through the medium of a fitting 27. A pipe 28 communicates with the port 18 and with a regulating valve c. This regulating valve includes a casing 29 having a central bore 30 and with a screw 31 screw threaded transversely at 32 to said casing and whereby upon turning said screw in one direction the opening 30 may be obstructed. The opening 30 likewise communicates with a pipe 33 which leads to the valve b. The valve b is detailed in Fig. 9. This valve includes a casing 34 adapted to be interposed within the delivery pipe 4 as illustrated in Fig. 9. This casing is provided with a valve seat 35 which divides the interior of the casing into chamber portions 36 and 37. The casing is formed to receive a member 38. The member 38 is centrally bored, one bore 39 being of lesser diameter than the bore 40, and the pipe 33 is received in part within said bore 40 as shown at 41. A tubular member 42 is passed through the bore 39 and said tubular member carries a valve disc 43 adapted to seat at times upon the valve seat 35. Within the bore 40 is a ball valve 44, said ball normally bearing against an end of the tubular member 42 being urged into such engagement through the medium of a coil spring 45. This ball 44 is of lesser diameter than the diameter of the bore 40, and when the ball is engaging an end of the tube 42 the said ball does not obstruct entrance within the tube as the tube is transversely bored at the ball engaging end as shown at 46. Normally the spring 45 urges the disc 43 to a seated position, when fluid is not being passed through the delivery pipe 4.

The only difference between the device B and the device A is in the container arrangement. The device B includes the container 50 having a curved chamber portion 51 of uniform diameter and within said chamber portion are two pistons 52 and 53. The top 54 of the container is formed with a central bore 55 and a tubular member 56 is passed through said bore and secured to the piston 52, the piston is formed with a bore 57 in communication with the bore in the tubular member. The top is provided with an enlarged central bore 58 adapted to receive a packing nut 59 and through which packing nut the said tubular member 56 is passed. This tubular member 56 is adapted to be in part confined within an elongated tubular casing 60, one end of which carries a plug 61. The tubular casing is enlarged at 62 and screw threaded to said top 54 as shown at 63. The top is formed with ports 64 and 65, the port 64 communicating with the space included within the part 62. A three-way valve 66 is included between the ports 64 and 65. A tube 67 communicates with the port 64 and with the valve b. In place of providing a separate valve c as was done in the case of the device A, we have provided in the present instance, a regulating screw 68 adapted to obstruct, if desired the port 64. The top 54 is likewise formed with an opening 69 adapted to receive a plug 70. The base 71 is screw threaded to the side wall of the casing, the base to this end being formed with a screw threaded flange 72. This base is provided with a central bore 73 through which is passed a stem 74 joined with the piston 53. A packing nut 75 surrounds the stem 74 so as to prevent leakage as between the stem and the bore. The base is likewise formed with ports 76 and 77 and a two-way valve 78 is located between said ports. The pipe 26 communicates with a portion of the port 76 and a further pipe 79 communicates with a second portion of said port.

The operation of the device A is as follows: Upon removing the filler plug 17, the chamber 8 will be filled with some liquid such as a perfume. Upon opening the valve 6 water will be forced up the delivery pipe from the pipes 1 and 2, and this water will contact with the valve disc 43 and unseat the same. As the pipe 26 communicates with the supply pipe 1, water under pressure will be received back of the piston 11, which will force said piston upwardly and likewise force the piston 10 upwardly to force the perfume into the pipe 28, past the valve c, through the pipe 33, thence said perfume will be passed through the tube 42, and such perfume will admix with the water flowing through the valve b. Upon closing the valve 6 the valve disc 43 will immediately seat, which will permit the ball 44 to close entrance within the tube 42 as the end of the tube, provided with the transverse opening 46, will be totally confined within the bore 39. In this connection the valve 25 will be turned so that said valve will permit communication between the pipe 26, the port 24 and the port 23. Upon turning the valve to the position shown in Fig. 2, pressure of water back of the piston 11 will be relieved. The by-pass port 21, of course, acts to relieve any pressure above the piston 11. It should be particularly noted that the construction of the base by providing a screw threaded flange for connection with the body of the container provides a rest for the piston 11, so that it is always possible to receive a fluid under said piston. This is true for both forms of the invention. It is evident that the construction of the container shown in Fig. 2 permits having differential piston operation so that the pressure asserted against the fluid contained within the chamber portion 8 is in proportion to the pounds per square inch pressure in the chamber 9. This is necessary in order that the liquid in the chamber 8 shall be properly forced to admix with the liquid passed through the delivery pipe 4. If the pressures were equal the liquids might not mix. The valve c acts to regulate the amount of liquid passed through the pipe 33.

The form of the invention shown in B is novel in that liquids of different properties may be utilized. For instance, a perfume might be received in the chamber of the container above the piston 52, and a second perfume or a soap or disinfectant received in said chamber between the pistons 52 and 53. When water under pressure passes the valve 78 and enters behind the piston 53 any liquid within the chamber between said pistons 52 and 53 will be forced through the opening 57 through the tubular member 56, whereupon said liquid will be received within the port 64. The valve 66, of course, will have to be turned so that the liquid might pass directly through the port 64 and into the pipe 67. When the valve is in the position shown in Fig. 6 the liquid above the piston 52 will be forced through the port 65 and outwardly through the port 64 into the pipe 67. If the valve was turned to a third position the liquids both above the piston 52 and included between the pistons 52 and 53 might be mixed and both liquids jointly forced through the pipe 67. The plug 70 permits a filling of the chamber above the piston 52, and the plug 61 permits the space between the two pistons to be filled. The stem 74 permits the piston 53 to be manually moved within the container. The valve 78 accomplishes a function similar to the valve 25.

It is evident that we have provided a device which while simple in structure yet is highly efficient for the use intended.

It is obvious that various changes, modifications and variations may be made in practising the invention in departure from the particular showing of the drawing without departing from the true spirit thereof.

Having thus disclosed our invention, what we claim and desire to obtain by Letters Patent is:

1. In mechanism of the class described, a valve inclusive of a member adapted to be moved by flow of fluid through said valve, said member having an internal passage for fluid formed therethrough, and a valve controlled by movement of said member to control flow of fluid through said passage.

2. In mechanism of the class described, a valve inclusive of a member having a normal position and adapted to be moved to a different position by flow of fluid through said valve, said member having an internal passage therethrough adapted for connection with a source of fluid supply, a valve element for controlling flow of fluid through said passage, and means common to said member and said valve element constantly urging the former to its normal position and the latter to a position denying flow of fluid through said passage, said valve element being arranged to be moved by said member to a position to permit flow of fluid through said passage when said member is moved to its second mentioned position.

3. In mechanism of the class described, a valve inclusive of a normally closed valve element adapted to be opened by flow of fluid through said valve, said valve element having an internal fluid passage formed therethrough, a valve element for controlling flow of fluid through said passage, and means acting through said second mentioned valve element to maintain said first mentioned valve element normally closed.

4. In mechanism of the class described, a valve inclusive of a normally closed valve element adapted to be opened by flow of fluid through said valve, said valve element having an internal fluid passage formed therethrough, a valve element for controlling flow of fluid through said passage, and a single spring maintaining both of said valve elements normally closed, said second mentioned valve element being arranged to be opened by opening movement of said first mentioned valve element.

5. In mechanism of the class described, a valve inclusive of a casing and a valve seat, a valve element cooperationg with said seat to control flow of fluid through said valve, said valve element being inclusive of a hollow fluid conducting stem, a valve seat surrounding said stem, and a second valve element cooperating with said second mentioned valve seat to control flow of fluid through said hollow stem.

6. In mechanism of the class described, a valve inclusive of a casing and a valve seat, a valve element cooperating with said seat to control flow of fluid through said valve, said valve element being inclusive of a hollow fluid conducting stem, a valve seat surrounding said stem, said first mentioned valve element being arranged to be opened by flow of fluid through said valve, said second mentioned valve element being arranged to be opened by opening movement of said first mentioned valve element, and a single spring urging both of said valve elements normally closed.

7. In combination with a pipe for conducting fluid, a casing having separate compartments adapted to contain different fluids for injection into said pipe, a pair of spaced pistons within said casing, one of said compartments being constituted by the space between said pistons, connections between said compartments and said pipe, and means whereby fluid from said pipe is adapted to move said pistons to inject fluid from said chambers into said pipe.

8. In combination with a valve controlled water service pipe, a receptacle having a piston therein providing a chamber between said piston and one end of the receptacle to contain liquid to be injected into said service pipe, a connection between said chamber and said service pipe, a connection between the other end of said receptacle and said service pipe between said control valve and the source of service water whereby said piston is constantly subjected to service water pressure tending to move said piston to force liquid from said receptacle into said service pipe, a normally closed automatic valve in said service water pipe between said control valve and the outlet end of said pipe adapted to be opened by pressure of the service water when said control valve is opened, and means whereby said automatic valve when closed prevents flow through said first mentioned connection and consequent injection of liquid from said receptacle into said service pipe and when opened permits injection of liquid from said receptacle into said service pipe.

In testimony whereof, we have signed our names to this specification.

THOMAS C. SHIELDS.
WALLACE J. CAMERON.